United States Patent
Peng et al.

(10) Patent No.: US 12,375,425 B2
(45) Date of Patent: *Jul. 29, 2025

(54) INTERACTIONS BETWEEN A BROADBAND NETWORK GATEWAY AND A FIFTH GENERATION CORE

(71) Applicant: Futurewei Technologies, Inc., Addison, TX (US)

(72) Inventors: Shuping Peng, Beijing (CN); Behcet Sarikaya, Wylie, TX (US); Huan Li, Shenzhen (CN); Marco Spini, Boulogne-Billancourt (FR)

(73) Assignee: Futurewei Technologies, Inc., Addison, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/334,967

(22) Filed: Jun. 14, 2023

(65) Prior Publication Data
US 2023/0328006 A1 Oct. 12, 2023

Related U.S. Application Data

(63) Continuation of application No. 16/889,332, filed on Jun. 1, 2020, now Pat. No. 11,722,434, which is a (Continued)

(51) Int. Cl.
*H04L 47/70* (2022.01)
*H04L 9/40* (2022.01)
(Continued)

(52) U.S. Cl.
CPC ........ *H04L 47/825* (2013.01); *H04L 12/2854* (2013.01); *H04L 12/4633* (2013.01);
(Continued)

(58) Field of Classification Search
CPC ............... H04L 47/825; H04L 12/2854; H04L 12/4633; H04L 61/2592; H04L 63/0892; H04L 12/4641; H04W 88/16
See application file for complete search history.

(56) References Cited

U.S. PATENT DOCUMENTS 8,615,017 B2 * 12/2013 Kato ...................... H04W 92/02
370/401
9,271,318 B2 2/2016 Sarikaya et al.
(Continued)

FOREIGN PATENT DOCUMENTS

CN 101370177 A 2/2009
CN 102740401 A 10/2012
(Continued)

OTHER PUBLICATIONS

"Part 11: Wireless LAN Medium Access Control (MAC) and Physical Layer (PHY) Specifications," IEEE Computer Society, IEEE Std 802.11, Dec. 7, 2016, 3534 pages.
(Continued)

*Primary Examiner* — Oussama Roudani
(74) *Attorney, Agent, or Firm* — Conley Rose, P.C.

(57) ABSTRACT

A broadband network gateway (BNG) in a wireline network. The BNG includes an interworking function in a control plane (IF-CP), the IF-CP configured to use a control plane interface (N1'/N2') between the BNG in the wireline network and a fifth generation (5G) core in a 5G network to couple a control plane of the BNG to a control plane of the 5G core; an interworking function in a user plane (IF-UP), the IF-UP configured to use a user plane interface (N3') between the BNG in the wireline network and the 5G core in the 5G network to couple a user plane of the BNG to a user plane of the 5G core; and a transmitter configured to transmit data packets toward the 5G core after the user plane
(Continued)

of the BNG and the user plane of the 5G core have been coupled.

20 Claims, 6 Drawing Sheets

Related U.S. Application Data continuation of application No. 15/983,332, filed on May 18, 2018, now Pat. No. 10,778,609.

(60) Provisional application No. 62/543,748, filed on Aug. 10, 2017.

(51) Int. Cl.
    *H04L 12/28* (2006.01)
    *H04L 12/46* (2006.01)
    *H04L 61/2592* (2022.01)
    *H04W 88/16* (2009.01)

(52) U.S. Cl.
    CPC ...... *H04L 61/2592* (2013.01); *H04L 63/0892* (2013.01); *H04W 88/16* (2013.01); *H04L 12/4641* (2013.01)

(56) References Cited

U.S. PATENT DOCUMENTS

| | | | |
|---|---|---|---|
| 10,057,391 | B2 | 8/2018 | Ahluwalia et al. |
| 10,778,609 | B2* | 9/2020 | Peng ............... H04L 47/825 |
| 10,993,139 | B2* | 4/2021 | Ahmad ............ H04W 36/0044 |
| 11,265,935 | B2* | 3/2022 | Bharatia ............ H04W 76/11 |
| 11,395,143 | B2 | 7/2022 | Yu et al. |
| 11,722,434 | B2* | 8/2023 | Peng ............... H04W 88/16 370/401 |
| 2012/0099578 | A1 | 4/2012 | Aramoto et al. |
| 2017/0208634 | A1 | 7/2017 | Bharatia et al. |
| 2018/0139670 | A1 | 5/2018 | Shaw et al. |
| 2019/0150219 | A1 | 5/2019 | Wang et al. |
| 2019/0200266 | A1 | 6/2019 | Jun et al. |
| 2019/0261178 | A1 | 8/2019 | Rajadurai et al. |
| 2019/0357301 | A1 | 11/2019 | Li et al. |
| 2019/0387428 | A1 | 12/2019 | Ahmad et al. |
| 2022/0167167 | A1 | 5/2022 | Jost et al. |

FOREIGN PATENT DOCUMENTS

| | | |
|---|---|---|
| WO | 2010081554 A1 | 7/2010 |
| WO | 2013174190 A1 | 11/2013 |
| WO | 2017023346 A1 | 2/2017 |
| WO | 2017024005 A1 | 2/2017 |
| WO | 2017123045 A1 | 7/2017 |

OTHER PUBLICATIONS

"IEEE Standard for Ethernet," IEE Computer Society, IEEE Std 802.3, Sep. 3, 2015, 4017 pages.

"3rd Generation Partnership Project; Technical Specification Group Services and System Aspects; Procedures for the 5G System; Stage 2; (Release 15)," 3GPP TS 23.502, V0.1.1, Technical Specification, Jan. 2017, 46 pages.

Broadband Forum "BBF Overview and Status Update," 3GPP-BBF Workshop SA2#119 3BF-170009, Feb. 18, 2017, 34 pages.

Huawei "Key Issues on supporting Wireline and Wireless Independent Core Network," 3GPP-BBF workshop SA2#119, 3BF-170014, Feb. 18, 2017, 7 pages.

China Mobile "5G System Architecture Progress in 3GPP SA2," 3GPP-BBF workshop SA2#119 3BF-170017, Feb. 18, 2017, 11 pages.

Leitao, F., et al., "Fixed-Mobile Convergence Towards the 5G Era: Convergence 2.0," IEEE Conference on Standards for Communications and Networking (CSCN), Dec. 19, 2016, 6 pages.

"IEEE Standard for Local and metropolitan area networks Virtual Bridged Local Area Networks Amendment 4: Provider Bridges," IEEE Standard 802.1ad, May 26, 2006, 74 pages.

"3rd Generation Partnership Project; Technical Specification Group Services and System Aspects; System Architecture for the 5G System; Stage 2 (Release 15)," 3GPP TS 23.501 v1.0.0 (Jun. 2017), 146 pages.

Simpson, "IP in IP Tunneling," RFC 1853, Oct. 1995, 8 pages.

Farinacci, et al., "Generic Routing Encapsulation (GRE)," RFC 2784, Mar. 2000, 9 pages.

Dommety, "Key and Sequence No. Extensions to Gre," RFC 2890, Sep. 2000, 7 pages.

"TR-101 Migration to Ethernet-Based Broadband Aggregation," Broadband Forum Technical Report, Issue 2: Jul. 2011, 101 pages.

"TR 384 Cloud Central Office Reference Architectural Framework," Broadband Forum Technical Report, Issue: 1, Jan. 2018, 80 pages.

"WT-384 Cloud Central Office Reference Architectural Framework," Broadband Forum Technical Report, Draft bbr2016.788, Revision: 8, May 2017, 85 pages.

Allan, D., et al., "3GPP-BBF Cooperation Workshop on 5G Convergence BBF Introductory Session Topics," Broadband Forum, 3GPP Draft; 3BF-170009, Feb. 10, 2017, XP051681828, 34 pages.

Huawei, "Key Issues on supporting Wireline and Wireless Independent Core Network," 3GPP Draft; 3BF-170014, Feb. 10, 2017, XP051681833,7 pages.

Leitao, F., et al., "Fixed-mobile convergence towards the 5G era: Convergence 2.0: The past, present and future of FMC standardization," Oct. 31, 2016, XP033026811, 6 pages.

3GPP TS 23.003 V15.0.0, "3rd Generation Partnership Project; Technical Specification Group Core Network and Terminals; Numbering, addressing and identification (Release 15)," Jun. 2017, 108 pages.

3GPP TS 23.401 V15.0.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Jun. 2017, 386 pages.

3GPP TS 29.281 V14.1.0, "3rd Generation Partnership Project; Technical Specification Group Core Network and Terminals; General Packet Radio System (GPRS) Tunnelling Protocol User Plane (GTPv1-U) (Release 14)," Jun. 2017, 30 pages.

3GPP TS 38.413 V0.2.1, "3rd Generation Partnership Project; Technical Specification Group Radio Access Network; NG Radio Access Network (NG-RAN); NG Application Protocol (NGAP) (Release 15)," Aug. 2017, 81 pages.

Wang, Z., et al., "Research on Network Storage Technology Based on I P", Dec. 24, 2008, 12 pages.

* cited by examiner

INTERACTIONS BETWEEN A BROADBAND NETWORK GATEWAY AND A FIFTH GENERATION CORE

CROSS-REFERENCE TO RELATED APPLICATIONS

This application is a continuation of U.S. patent application Ser. No. 16/889,332 filed on Jun. 1, 2020, which is a continuation of U.S. patent application Ser. No. 15/983,332, now U.S. Pat. No. 10,778,609, filed on May 18, 2018, which claims the benefit of U.S. Provisional Patent Application No. 62/543,748 filed Aug. 10, 2017, each of which is hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fifth generation wireless networks (5G) are predicted to be the next improvement over current fourth generation (4G) and 4G Long Term Evolution (LTE) networks. Mechanisms have been introduced to couple a wireless network to the 5G network. However, there is currently no mechanism for coupling a wireline network (a.k.a., a fixed network) to the 5G network. Examples of wireline networks include an optical network (e.g., a passive optical network (PON)), a digital subscriber line (DSL) network, hybrid fiber coax (HFC) network, and so on.

SUMMARY

In an embodiment, the disclosure includes a broadband network gateway (BNG) in a wireline network. The BNG includes a memory containing instructions and a processor coupled to the memory. The processor is configured to execute the instructions to generate an interworking function in a control plane (IF-CP), the IF-CP configured to use a control plane interface (N1'/N2') between the BNG in the wireline network and a fifth generation (5G) core in a 5G network to couple a control plane of the BNG to a control plane of the 5G core, and generate an interworking function in a user plane (IF-UP), the IF-UP configured to use a user plane interface (N3') between the BNG in the wireline network and the 5G core in the 5G network to couple a user plane of the BNG to a user plane of the 5G core. The BNG also includes a transmitter configured to transmit data packets toward the 5G core after the user plane of the BNG and the user plane of the 5G core have been coupled.

Optionally, in any of the preceding aspects, another implementation of the aspect provides that the IF-CP is configured to communicate over the control plane interface with an access mobility and management function (AMF) component in the control plane of the 5G core to register and authenticate a residential gateway (RG) coupled to the BNG and serving a wired device. Optionally, in any of the preceding aspects, another implementation of the aspect provides that a temporary identifier (ID) corresponding to the residential gateway is included in a registration request sent from the IF-CP to the AMF component in the 5G core in the 5G network. Optionally, in any of the preceding aspects, another implementation of the aspect provides that the temporary ID is marked with location information of the residential gateway. Optionally, in any of the preceding aspects, another implementation of the aspect provides that the IF-UP is configured to send a tunnel endpoint ID (TEID) of the IF-UP to the IF-CP. Optionally, in any of the preceding aspects, another implementation of the aspect provides that the IF-CP is configured to receive a TEID of a user plane function (UPF) component in the control plane of the 5G core. Optionally, in any of the preceding aspects, another implementation of the aspect provides that the IF-CP is configured to send the TEID of the UPF component to the IF-UP. Optionally, in any of the preceding aspects, another implementation of the aspect provides that the BNG is configured to establish a session using the TEID of the IF-UP and the TEID of the UPF component. Optionally, in any of the preceding aspects, another implementation of the aspect provides that the BNG is configured to set up a tunnel between the BNG and the 5G core after establishment of the session. Optionally, in any of the preceding aspects, another implementation of the aspect provides that the IF-UP is configured to encapsulate a data packet with a tunnel header to facilitate transmission of the data packet over the tunnel. Optionally, in any of the preceding aspects, another implementation of the aspect provides that the tunnel header includes the TEID of the UPF component.

In an embodiment, the disclosure includes a broadband network gateway (BNG) in a wireline network. The BNG includes a memory containing instructions and a processor coupled to the memory. The processor is configured to execute the instructions to generate an interworking function in a control plane (IF-CP), the IF-CP configured to exchange registration messages with a fifth generation (5G) core in a 5G network to register a residential gateway in the wireline network, at least one of the registration messages containing a temporary identifier (ID) corresponding to the residential gateway; exchange authentication messages with the 5G core to authenticate the residential gateway; and exchange session messages with the 5G core to establish a session between the BNG and the 5G core, one of the session messages containing a tunnel endpoint ID for the BNG and another of the session messages containing a tunnel endpoint ID for a user plane function (UPF) component in the 5G core, and generate an interworking function in a user plane (IF-UP), the IF-UP configured to set up a tunnel between the BNG and the 5G core after establishment of the session.

Optionally, in any of the preceding aspects, another implementation of the aspect provides that the temporary ID corresponding to the residential gateway is included in a registration request sent from the IF-CP to access and mobility management function (AMF) component in a control plane of the 5G core. Optionally, in any of the preceding aspects, another implementation of the aspect provides that the IF-UP is configured to encapsulate a data packet with a tunnel header to facilitate transmission of the data packet over the tunnel. Optionally, in any of the preceding aspects, another implementation of the aspect provides that the tunnel header includes a temporary identifier (TEID) of the UPF.

In an embodiment, the disclosure includes a method of facilitating communications between a wireline network and a fifth generation (5G) network. The method includes transmitting, by an interworking function in a control plane (IF-CP) of a broadband network gateway (BNG), a registration request to a 5G core in the 5G network, the registration request carrying a temporary identifier (ID) with location information corresponding to a residential gateway (RG) in the wireline network; exchanging, by the IF-CP, authentication messages with the 5G core to authenticate the RG; exchanging, by the IF-CP, registration messages with the 5G core to complete registration; transmitting, by the IF-CP, a protocol data unit (PDU) session establishment request to the 5G core, the PDU session establishment request carrying an identifier (ID) of the RG; receiving, from the 5G core, a PDU session acknowledgement (ACK) and establishing a session, the PDU session ACK carrying a tunnel endpoint identifier (TEID) of a user plane function (UPF) in the 5G core; providing, by the IF-CP, the TEID of the UPF in the 5G core to a user plane (IF-UP) of the BNG such that the IF-UP of the BNG is able to establish a tunnel based on the session; encapsulating a data packet with a tunnel header including the TEID of the UPF in the 5G core; and transmitting a data packet over the tunnel to the 5G core.

Optionally, in any of the preceding aspects, another implementation of the aspect provides that the TEID of the 5G core corresponds to a user plane function (UPF) component in the 5G core. Optionally, in any of the preceding aspects, another implementation of the aspect provides that the tunnel comprises a general packet radio service (GPRS) tunneling protocol for user data (GTP-U) tunnel. Optionally, in any of the preceding aspects, another implementation of the aspect provides that the tunnel between the IF-UP and a user plane function (UPF) of the 5G core comprises a generic route encapsulation (GRE) tunnel or an Ethernet-based virtual local area network (VLAN) Layer 2 tunnel. Optionally, in any of the preceding aspects, another implementation of the aspect provides that the temporary ID corresponding to the RG is included in a registration request sent from the IF-CP to an access and mobility management function (AMF) component in a control plane of the 5G core. Optionally, in any of the preceding aspects, another implementation of the aspect provides that the IF-CP transmits a shared secret to an authentication server function (AUSF) of the 5G core by way of an access management mobility function (AMF) of the 5G core to enable the 5G core to fast authenticate the RG in two round trips instead of four or more round trips.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for coupling a wireline network to a 5G network. Coupling is facilitated by supplementing a broadband network gateway (BNG) in the wireline network with an interworking function in the control plane (IF-CP) and an interworking function in the user plane (IF-UP). As will be more fully explained below, the IF-CP uses a control plane interface (N1'/N2') between the BNG in the wireline network and a 5G core in the 5G network to couple the control plane of the BNG to the control plane of the 5G core. In addition, the IF-UP uses a user plane interface (N3') between the BNG in the wireline network and the 5G core in the 5G network to couple the user plane of the BNG to the user plane of the 5G core.

Figure 1:
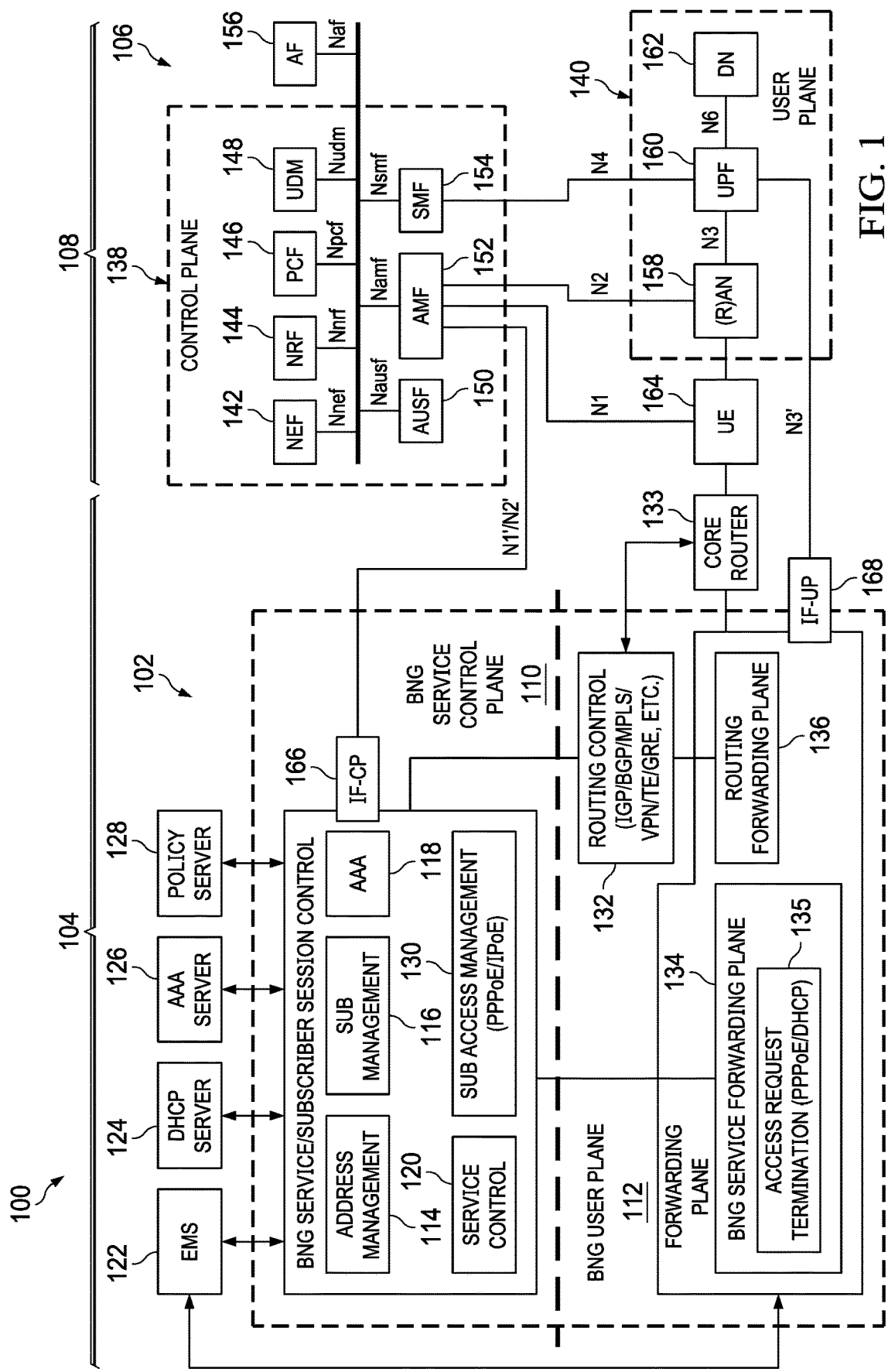
FIG. 1 is a schematic diagram of a broadband network gateway (BNG) from a wireline network and a fifth generation (5G) core from a 5G network.

FIG. 1 is a schematic diagram 100 of a BNG 102 from a wireline network 104 and a 5G core 106 from a 5G network 108. The 5G core 106 may be, for example, a 5G core as described and illustrated in the 3rd Generation Partnership Project (3GPP) document technical report (TR) 23.501, January 2017 (see, e.g., FIG. 4.2.3-1), which is incorporated herein by reference. As shown, a horizontal line in the BNG 102 separates components within a control plane 110 from components within a user plane 112. The control plane 110 includes an address management component 114, a subscriber management component (Sub Mgt) 116, an authentication, authorization, accounting component (AAA) 118, and a service control component 120. Both the BNG control plane 110 and the user plane 112 are coupled to an element management system (EMS) 122 external to the BNG 102. The address management component 114 is coupled to a dynamic host configuration protocol (DHCP) server 124 external to the BNG 102. The AAA component 118 is the AAA client coupled to an AAA server 126 external to the BNG 102. The service control component 120 is coupled to a policy server 128 external to the BNG 102.

The control plane 110 of the BNG 102 also includes a subscriber access management component 130 configured to implement point-to-point protocol over Ethernet (PPPoE) and/or Internet protocol over Ethernet (IPoE) to terminate the subscribers' access requests. Collectively, the address management component 114, the subscriber management component 116, the AAA component 118, the service control component 120, and the subscriber access management component 130 may facilitate BNG service/subscriber session control.

The user plane 112 of the BNG 102 includes a routing control component 132 configured to implement an interior gateway protocol (IGP), a border gateway protocol (BGP), multiprotocol label switching (MPLS), a virtual private network (VPN), traffic engineering (TE), generic routing encapsulation (GRE), and so on. The routing control component 132 is coupled to a core router 133 external to the BNG 102.

The user plane 112 of the BNG 102 also includes a BNG service forwarding plane 134 containing an access request termination component 135 configured to implement PPPoE and DHCP. The BNG service forwarding plane 134 is coupled to the routing control component 132. The user plane 112 of the BNG 102 further includes a routing forwarding plane 136. The BNG 102 is discussed in detail in the Broadband Forum (BBF) document TR384 entitled "Cloud Central Office Reference Architectural Framework," dated January 2018, which is incorporated herein by reference. Collectively, the BNG service forwarding plane 134 and the routing forwarding plane 136 may operate as a forwarding place.

The 5G network 108 includes a 5G core 106, an access or radio access network ((R)AN) 158, and a data network (DN) component 162. The 5G core 106 includes a control plane 138. The control plane 138 includes a network exposure function (NEF) component 142, a network repository function (NRF) component 144, a policy control function (PCF) component 146, a unified data management (UDM) component 148, an authentication server function (AUSF) component 150, an access and mobility management function (AMF) component 152, and a session management function (SMF) component 154. Each of these components is coupled to the other components in the control plane 138 through a correspondingly named interface labeled Nnef, Nrf, Npcf, Nudm, Nausf, Namf, and Nsmf. An application function (AF) component 156 external to the control plane 138 is coupled to the components within the 5G core 106 through the Naf interface.

The 5G core 106 also includes a user plane 140. The user plane 140 includes a user plane function (UPF) component 160 in communication with the (R)AN 158 and the DN component 162. The (R)AN 158 is coupled to a user equipment (UE) 164 (e.g., a mobile phone, a tablet, etc.) external to the user plane 140. The 5G core 106 is discussed in detail in the 3$^{rd}$ Generation Partnership Project (3GPP) document 3GPP TS23.501 entitled "Technical Specification Group and System Aspects; System Architecture for the 5G System; Stage 2," dated December 2017, which is incorporated herein by reference.

The UE 164 is coupled to the AMF 152 through an interface (N1) and the SMF 154 is coupled to the UPF 160 through another interface (N4). In addition, the (R)AN 158 is coupled to the AMF 152 through an interface (N2) and to the UPF 160 through another interface (N3). The N2 and N3 interfaces are used to couple a wireless network to the 5G core 106. Unfortunately, there is currently no mechanism for coupling the wireline network 104 to the 5G network 108.

In order to couple the wireline network 104 to the 5G core 106, the present disclosure supplements the BNG 102 in the wireline network 104 with an IF-CP 166 and an IF-UP 168. The IF-CP 166 uses control plane interface (N1'/N2') between the BNG 102 and the 5G core 106 to couple the control plane 110 of the BNG 102 to the control plane 138 of the 5G core 106. In addition, the IF-UP 168 uses the user plane interface (N3') between the BNG 102 and the 5G core 106 to couple the user plane 112 of the BNG 102 to the UPF 160 in the user plane 140 of the 5G network 108. In an embodiment, the one or both of the IF-CP 166 and the IF-UP 168 are implemented in hardware, by software, or some combination thereof.

In an embodiment, the N2' interface is disposed between the IF-CP 166 in the control plane 110 of the BNG 102 and the AMF 152 in the control plane 138 of the 5G core 106. In an embodiment, the N3' interface is disposed between the IF-UP 168 in the user plane 112 of the BNG 102 and the UPF 160 in the user plane 140 of the 5G network 108.

Figure 2:
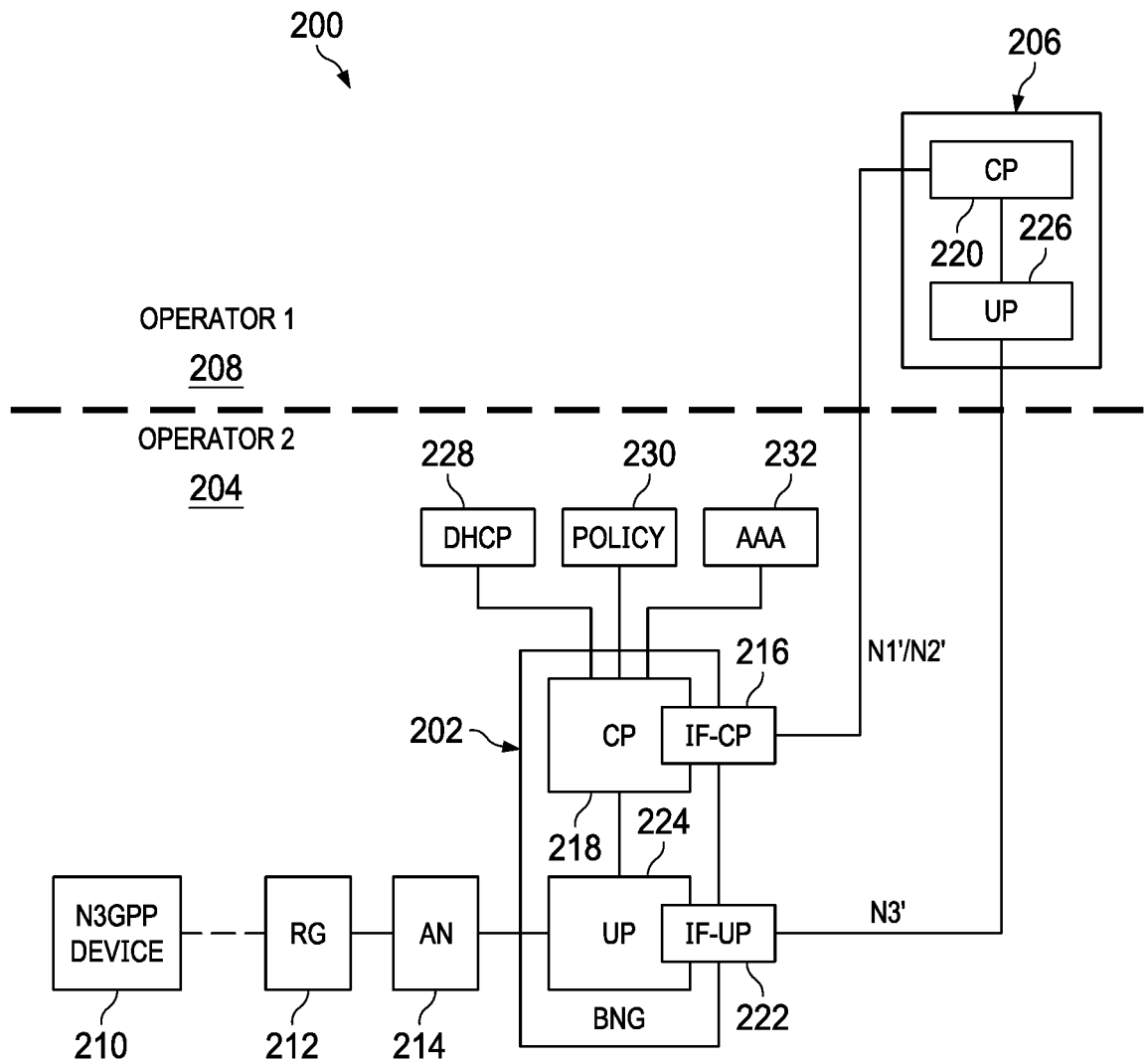
FIG. 2 is schematic diagram of a BNG in the wireline network and the 5G core in the 5G network.

FIG. 2 is schematic diagram 200 of a BNG 202 in the wireline network 204 and the 5G core 206 in the 5G network 208. The BNG 202 and 5G core 206 of FIG. 2 are similar to the BNG 102 and the 5G core 106 of FIG. 1. In an embodiment, the 5G core 206 in the 5G network 208 is managed by a first operator (Operator 1) while the BNG 202 in the wireline network 204 is managed by a second operator (Operator 2). A dashed line has been included in FIG. 2 to illustrate the separation between the wireline network 204 and the 5G network 208.

As shown in FIG. 2, a non-3GPP device 210 (e.g., a home computer, etc.) is coupled to a residential gateway (RG) 212. While a single non-3GPP device is depicted in FIG. 2, a plurality of the non-3GPP devices may be coupled to and served by the RG 212 in practical applications. The RG 212 is coupled to an access node (AN) 214, which is then coupled to the BNG 202. As such, the non-3GPP device 210 and the BNG 202 are in communication and able to exchange data.

The IF-CP 216 in the BNG 202 permits the control plane 218 of the BNG 202 to be coupled to the control plane 220 of the 5G core 206 through the N1'/N2' interface. In addition, the IF-UP 222 in the BNG 202 permits the user plane 224 of the BNG 202 to be coupled to the user plane 226 of the 5G core 206 through the N3' interface. Use of the N1'/N2' interface and the N3' interface are described in further detail below.

As shown in FIG. 2, the BNG 202 is coupled to a DHCP server 228, a policy server 230, and an AAA server 232. The DHCP server 228, policy server 230, and AAA server 232 of FIG. 2 are similar to the DHCP server 124, policy server 128, and AAA server 126 of FIG. 1, respectively.

Figure 3:
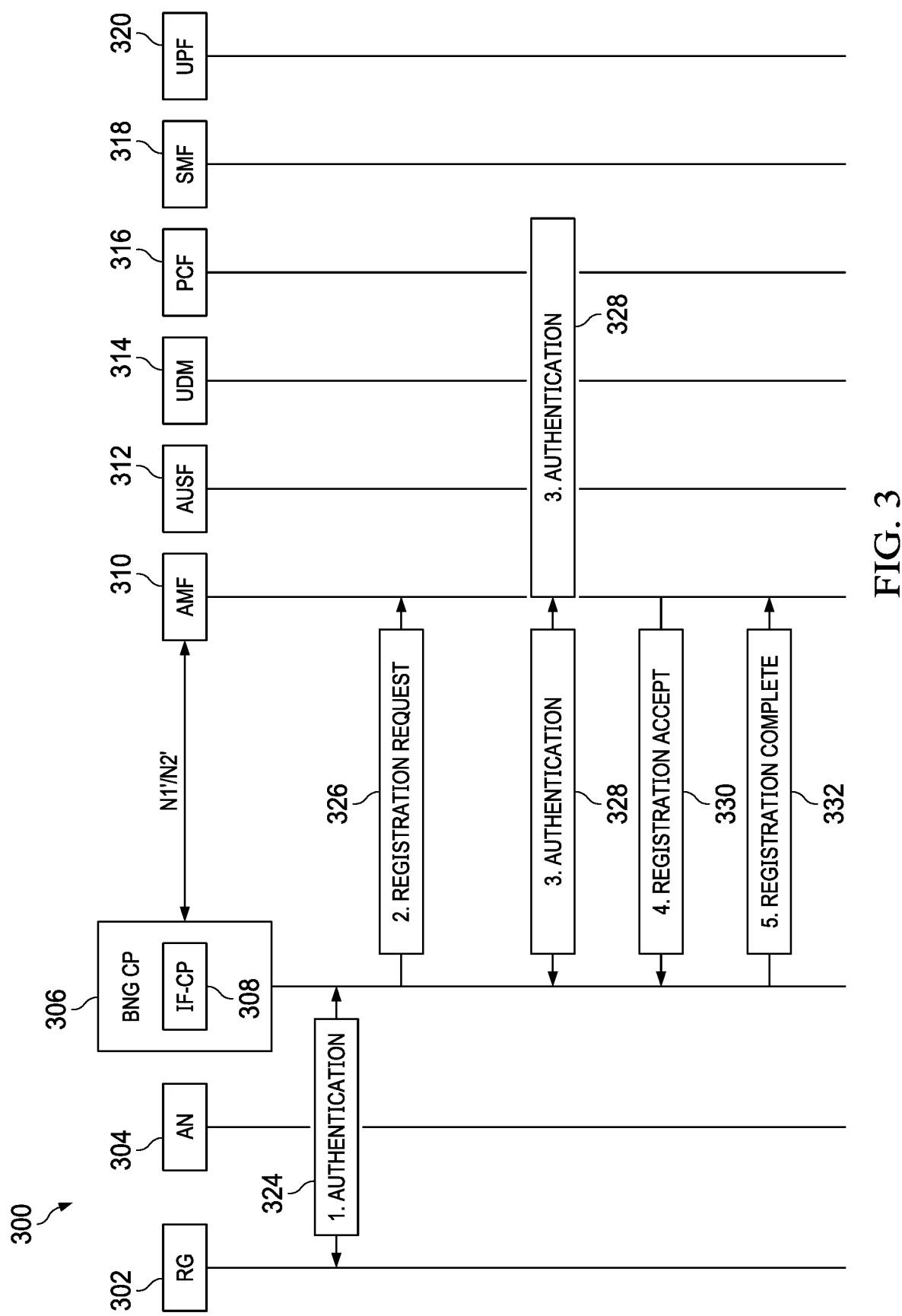
FIG. 3 is a sequence diagram illustrating a registration and authentication procedure performed over an N1'/N2' interface.

FIG. 3 is a sequence diagram 300 illustrating a registration and authentication procedure performed over the N1'/N2' interface. The sequence diagram 300 illustrates interactions between one or more of an RG 302, an AN 304, a BNG control plane (CP) 306 having an IF-CP 308, an AMF 310, an AUSF 312, a UDM 314, a PCF 316, an SMF 318, and a UPF 320, which are similar to similarly named elements in FIGS. 1-2. As shown, the control plane interface N1'/N2' extends between IF-CP 308 and the AMF 310. Although not shown in FIG. 3, the RG 302, the AN 304, and the BNG control plane 306 are disposed in a wireline network (e.g., wireline network 104, 204) while the AMF 310, the AUSF 312, the UDM 314, the PCF 316, the SMF 318, and the UPF 320 are disposed in a 5G network (e.g., the 5G network 108, 208). In practical applications, the IF-CP 308 and the BNG CP 306 do not need to be co-located. That is, the IF-CP 308 is a separate function that interacts with, but is not located within, the BNG CP 306.

As shown, an authentication procedure 324 is initiated through the wireline network to authenticate the RG 302 with the BNG control plane 306. In an embodiment, the BNG records (e.g., stores in memory) the information corresponding to the authentication of the RG 302. Because the information corresponding to the RG 302 has already been recorded in the BNG, the BNG only needs to relay relevant information to the control plane of the 5G core during authentication. In an embodiment, the registration request 326 is sent after the RG 302 has been authenticated by the BNG (e.g., BNG 102, 202).

When there is a need to access the 5G network (e.g., 5G service provisioning), the IF-CP 308 sends a registration request 326 to the AMF 310 of the 5G core. In an embodiment, the registration request 326 carries a non-access stratum (NAS) message that includes the identification of the RG 302. In an embodiment, the RG 302 is identified using a circuit identification (ID) and a remote ID of the attached AN 304 as defined in the BFF document TR-101i2 entitled "Migration to Ethernet-Based Broadband Aggregation," dated July 2011, which is incorporated herein by reference.

In an embodiment, the IF-CP 308 gets the authentication related information of the RG 302 from the BNG (e.g., BNG 102, 202 of FIGS. 1-2). In an embodiment, the registration request 326 carries a subscriber permanent identifier (SUPI), a temporary device identifier (ID) corresponding to the RG 302 (if already registered with the 5G core), network slice selection assistance information (NSSAI), or other information used to locate and/or select the AMF 310.

In an embodiment, the temporary ID is marked with the location information (e.g., the remote ID and circuit ID) of the RG 302 serving the non-3GPP device. In an embodiment, the SUPI is the location information of the RG 302 (e.g., the remote ID and circuit ID of the access node). When the SUPI is not provided, the identity request procedure will be initiated by the AMF 310 sending an identity request message to the IF-CP 308. The IF-CP 308 responds with an identity response message including the SUPI. In an embodiment, the location information identifies the remote ID and circuit ID corresponding to the access node digital subscriber line access multiplexer (DSLAM). In an embodiment, the temporary ID or the NSSAI is used to locate and/or select the AMF 310 in the 5G core. One purpose of the registration step is to inform the AMF 310 that the RG 302 is online and legal. In an embodiment, the registration request 326 includes a shared secret generated by the IF-CP 308 and/or BNG.

Following the registration request 326, the authentication procedure 324 in the 5G core is performed to verify that the RG 302 is valid and legal. As shown, the IF-CP 308 and the AMF 310 exchange authentication messages and the AMF 310, AUSF 312, UDM 314, and PCF 316 participate in authentication.

In an embodiment, two alternative authentication options exist. As a first option, a common 3GPP authentication procedure is performed as defined in 3GPP TS23.502, "3rd Generation Partnership Project, Technical Specification Group Services and System Aspects, Procedures for the 5G System, Stage 2 (Release 15)," published January 2017, which is incorporated herein by reference. As a second option, when the 5G Core and the BNG are operated by the same operator or an inter-operator agreement exists between the two operators, they are able to share a secret key that is either pre-configured or derived and generated by the IF-CP 308 and/or BNG CP 306 and sent to the AUSF 312/UDM 314 via AMF 310. The secret key is used to indicate that the RG 302 has already been authenticated by the BNG of a trusted operator and it is trustworthy. As such, no more complex authentication/calculation needs to be performed in the 5G Core (e.g., AMF 310, AUSF 312, and UDM 314). This enables a simplified and a fast authentication procedure. The rest of the registration procedures may be the same as those already defined in 3GPP TS23.502.

If the authentication 328 is successful, the AMF 310 sends a registration acceptance message 330 to the IF-CP 308. In an embodiment, the registration acceptance message 330 is an NAS message. Otherwise, the AMF 310 sends a registration reject message (not shown) to the IF-CP 308. In an embodiment, the registration reject message is an NAS message.

Upon receiving the registration acceptance message 330, the IF-CP 308 sends a registration complete message 332 to the AMF 310. In an embodiment, the registration complete message 332 is an NAS message.

In an embodiment, because the BNG already authenticated the RG 302 and generated the shared secret, the IF-CP 308 is able to send the shared secret to the AUSF 312 via the AMF 310. The shared secret enables the 5G core to fast authenticate the RG 302 with no need to perform more complex authentication/calculation in the 5G Core 106 (e.g., in the AMF 310, the AUSF 312, the UDM 314). Thus, authentication may be completed in two round trips instead of a regular authentication using four or five round trips.

Figure 4:
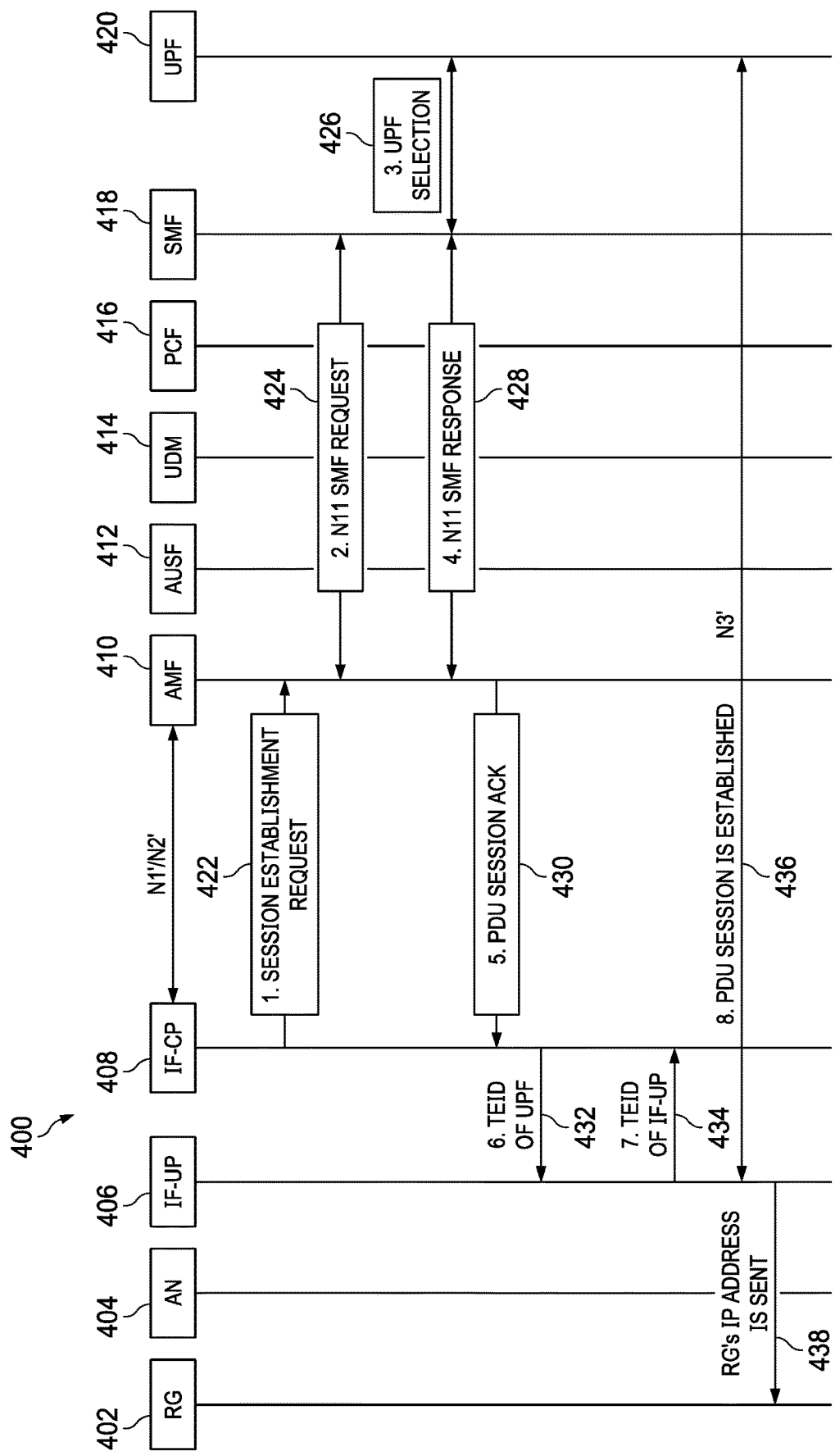
FIG. 4 is a sequence diagram illustrating a session establishment procedure over the N1'/N2' interface.

FIG. 4 is a sequence diagram 400 illustrating a session establishment procedure over the N1'/N2' interface. The sequence diagram 400 illustrates interactions between one or more of an RG 402, an AN 404, an IF-UP 406, an IF-CP 408, an AMF 410, an AUSF 412, a UDM 414, a PCF 416, an SMF 418, and a UPF 420, which are similar to similarly named elements in FIGS. 1-3. As shown, the control plane interface N1'/N2' extends between the IF-CP 408 and the AMF 410 and the user plane interface N3' extends between the IF-UP 406 and the UPF 420. Although not shown in FIG. 4, the RG 402, the AN 404, the IF-UP 406, and the IF-CP 408 are disposed in a wireline network (e.g., wireline network 104, 204) while the AMF 410, the AUSF 412, the UDM 414, the PCF 416, the SMF 418, and the UPF 420 are disposed in a 5G network (e.g., the 5G network 108, 208).

In an embodiment, a service request from the RG 402 serving the non-3GPP device (e.g., non-3GPP device 210 in FIG. 2) triggers the session establishment procedure. In an embodiment, the IF-CP 408 sends a protocol data unit (PDU) session establishment request 422 to the AMF 410 of the 5G core. The PDU session establishment request 422 contains an identifier (ID) of the RG 402.

Next, the AMF 410 and the SMF 418 in the control plane of the 5G core participate in an N11 SMF request exchange 424. During this exchange, the PDU session establishment request 422 message is sent by the AMF 410 to the SMF 418 in the control plane of the 5G core. The SMF 418 in the control plane of the 5G core selects a UPF 420 in the user plane of the 5G core in a UPF selection exchange 426 and obtains the tunnel endpoint identifier (TEID) of the selected UPF 420. The SMF 418 and the AMF 410 participate in an N11 response exchange 428. During this exchange, the TEID of the selected UPF 420 is sent by the SMF 418 to the AMF 410.

The AMF 410 sends a PDU session acknowledgement (ACK) message 430 to the IF-CP 408 in the wireline network. The PDU session ACK 430 contains the TEID of the selected UPF 420. Thereafter, the IF-CP 408 provides the TEID of the UPF 420 to the IF-UP 406 in a message 432. In response, the IF-UP 406 provides the TEID of the IF-UP 406 to the IF-CP 408 in a response message 434. Using the TEID of the IF-UP 406 and the TEID of the UPF 420, the IF-UP 406 and the UPF 420 are able to establish a session 436 using the N3' interface. In an embodiment, the IF-CP 408 obtains the internet protocol (IP) address of the RG 402 from the PDU session ACK 430 (a.k.a., the PDU establishment accept message). In an embodiment, the IP address of the RG 402 is forwarded to the RG 402 in a message 438.

Once the session has been established, the BNG is able to set up a tunnel between the BNG and the 5G core. In an embodiment, the tunnel extends between the IF-UP 406 and the UPF 420 of the 5G core and corresponds to the N3' interface shown in FIG. 1. In an embodiment, the tunnel comprises a general packet radio service (GPRS) tunneling protocol for user data (GTP-U) tunnel. As will be more fully explained below, the TEID of the UPF 420 is used by the IF-UP 406 when data packets are sent to the UPF 420.

Figure 5:
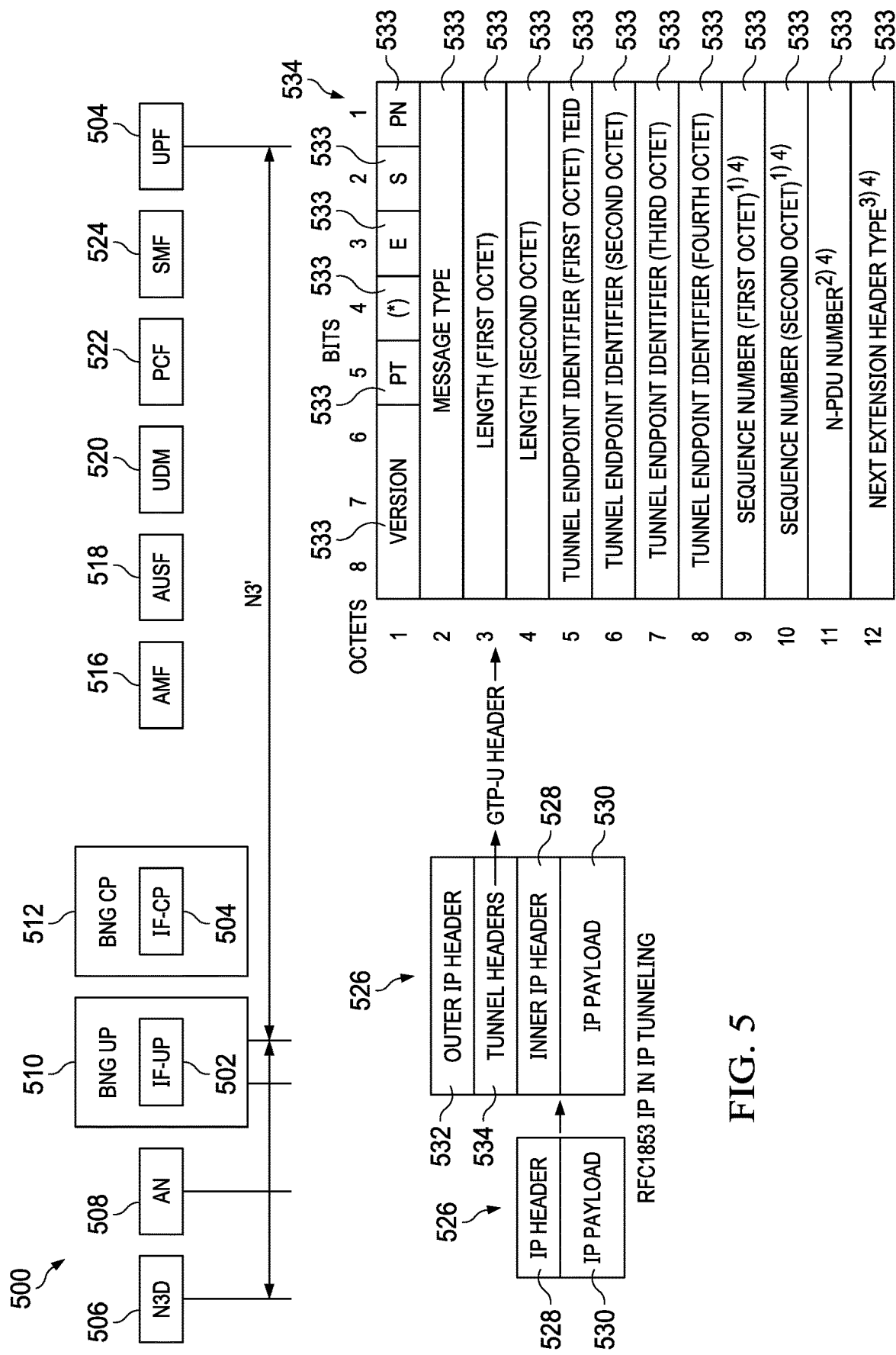
FIG. 5 is a data encapsulation process utilized to send data packets through the tunnel between interworking function in the user plane (IF-UP) of the BNG and the user plane function (UPF) of the 5G core.

FIG. 5 is a data encapsulation process 500 utilized to send data packets through the tunnel between the IF-UP 502 of the BNG and the UPF 504 of the 5G core. For reference, the process 500 identifies an RG 506 (labeled N3D), an AN 508, a BNG UP 510, a BNG CP 512, an IF-CP 514, an AMF 516, an AUSF 518, a UDM 520, a PCF 522, and an SMF 524, which are similar to similarly named elements in FIGS. 1-4. In an embodiment, a protocol stack at the interface between the RG 506 and the AN 508 (a.k.a., a U interface) and at the interface between the AN 508 and the BNG (a.k.a., a V interface) corresponds to IP or IPoE. Therefore, the data packets 526 include an IP header 528 and an IP payload 530 as shown in FIG. 5.

When the non-3GPP device (e.g., non-3GPP device 210 of FIG. 2) sends the data packets 526 to the BNG, the IF-UP 502 in the user plane encapsulates the data packets 526 using IP-in-IP encapsulation. During such encapsulation, an outer IP header 532 and tunnel headers 534 are added to the data packet 526 as shown in FIG. 5. In an embodiment, one or more of the tunnel headers 534 comprises a GTP-U header. At least one of the tunnel headers 534 contains the TEID of the UPF 504 selected to receive the data packets 526. As such, the data packets 526 are directed to the desired UPF 504 through the tunnel over the N3' interface. In similar fashion, the TEID of the IF-UP 502 may be included in one of the fields 533 (e.g., in Octets 5-8) in the tunnel header 534 when data packets 526 are transmitted by the UPF 504 toward the non-3GPP device. As shown, the fields 533 may contain a variety of other information in practical applications.

In an embodiment, tunneling protocols other than GTP-U may be used. In an embodiment, the tunneling protocol over N3' between the IF-UP 502 and the UPF 504 may comprise generic route encapsulation (GRE). Additional details regarding GRE are found in the Internet Engineering Task Force (IETF) Request for Comments (RFC) 2784 document titled "Generic Routing Encapsulation (GRE)," and dated March 2000, and in the IETF RFC 2890 document entitled "Key and Sequence Number Extensions to GRE," and dated September 2000, each of which is incorporated herein by reference. In an embodiment, the tunneling protocol over N3' between the IF-UP 502 and the UPF 504 may be Ethernet-based virtual local area network (VLAN) Layer 2 tunneling as described in Institute of Electrical and Electronics Engineers (IEEE) 802.1ad, which is informally known as QinQ, published May 26, 2006, which is incorporated herein by reference. Additional details regarding IP tunneling are found in the IETF RFC 1853 document entitled, "IP in IP Tunneling," and dated October 1995, which is incorporated herein by reference.

Figure 6:
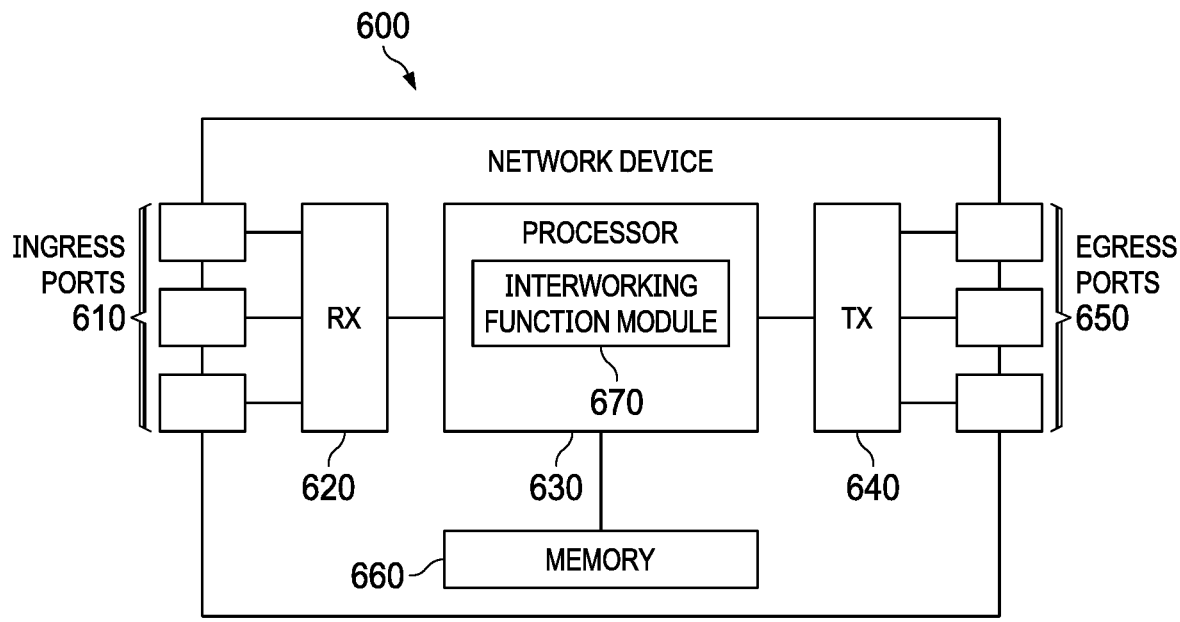
FIG. 6 is a schematic diagram of a network device.

FIG. 6 is a schematic diagram of a network device 600 according to an embodiment of the disclosure. The network device 600 is suitable for implementing the disclosed embodiments as described herein. The network device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The network device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

The processor 630 is implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is in communication with the ingress ports 610, receiver units 620, transmitter units 640, egress ports 650, and memory 660. The processor 630 comprises an interworking function module 670. The interworking function module 670 implements the disclosed embodiments described above. For example, the interworking function module 670 is able to implement the functions of the IF-CP 166 and/or the IF-UP 168. For instance, the interworking function module 670 participates in registration and authentication procedures, session establishment procedures, encapsulation, and so on. The inclusion of the interworking function module 670 therefore provides a substantial improvement to the functionality of the network device 600 and effects a transformation of the network device 600 to a different state. Alternatively, the interworking function module 670 is implemented as instructions stored in the memory 660 and executed by the processor 630. In an embodiment, the interworking function module 670 is implemented outside the network device 600. That is, the interworking function module 670 is a standalone function that interacts with the network device 600.

The memory 660 comprises one or more disks, tape drives, and solid-state drives and may be used as an overflow data storage device, to store programs when such programs are selected for execution, and to store instructions and data that are read during program execution. The memory 660 may be volatile and/or non-volatile and may be read-only memory (ROM), random access memory (RAM), ternary content-addressable memory (TCAM), and/or static random-access memory (SRAM).

Figure 7:
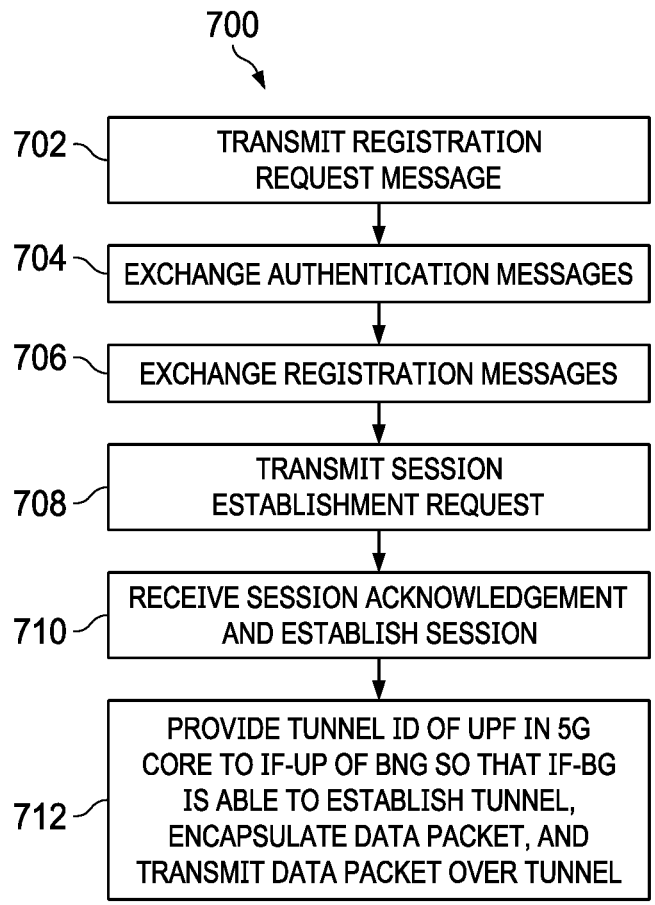
FIG. 7 is a method of facilitating communications between a wireline network and a 5G network.

FIG. 7 is a method 700 of facilitating communications between a wireline network and a 5G network. The method may be implemented by a BNG (e.g., BNG 102 in FIG. 1). In step 702, the IF-CP (e.g., IF-CP 308) in the control plane of the BNG transmits a registration request message (e.g., registration request message 326) to the AMF (e.g., AMF 310) of the 5G core in the 5G network. In an embodiment, the registration request message carries a temporary identifier with location information corresponding to an RG (e.g., 302) in the wireline network. In step 704, the IF-CP exchanges authentication messages with the AMF of the 5G core to authenticate the RG. In an embodiment, one of the authentication messages includes the shared secret to enable fast authentication (e.g., the two round trip fast authentication) as discussed above. In step 706, the IF-CP exchanges registration messages with the 5G core to complete registration.

In step 708, the IF-CP transmits a PDU session establishment request (e.g., session establishment request 422) to the AMF of the 5G core. In an embodiment, the PDU session establishment request carries the ID of the RG (e.g., RG 402). In response to receiving the PDU session establishment message, the AMF transmits an N11 SMF request (e.g., N11 request exchange 424) to the SMF (e.g., SMF 418). After the N11 SMF request is received, the SMF selects a UPF by exchanging UPF selection messages (e.g., during UPF selection exchange 426) with the UPF. Next, the UPF provides the TEID of the UPF of the 5G core to the SMF and the SMF transmits an N11 SMF Response (e.g., N11 SMF Response 428) containing the TEID of the UPF to the AMF.

In step 710, the IF-CP receives a PDU session ACK (e.g., PDU session ACK 430) carrying the TEID of the selected UPF from the AMF and establishes a session. In step 712, the IF-CP provides the TEID of the UPF to the IF-UP so that the IF-UP is able to establish a tunnel based on the session, encapsulate a data packet with a tunnel header including TEID of the UPF in the 5G core, and transmit a data packet over the tunnel to the 5G core.

From the foregoing, it should be appreciated that the present disclosure provides systems and methods for coupling a wireline network to a 5G network. Coupling is facilitated by supplementing the BNG in the wireline network with the IF-CP and the IF-UP. By sharing a secret key between the BNG and the 5G core, a simplified authentication/registration process is provided.

A broadband network gateway (BNG) in a wireline network. The BNG including an interworking function in a control plane (IF-CP) means, the IF-CP means configured to use a control plane interface (N1'/N2') between the BNG in the wireline network and a fifth generation (5G) core in a 5G network to couple a control plane of the BNG to a control plane of the 5G core; an interworking function in a user plane (IF-UP) means, the IF-UP means configured to use a user plane interface (N3') between the BNG in the wireline network and the 5G core in the 5G network to couple a user plane of the BNG to a user plane of the 5G core; and transmission means configured to transmit data packets toward the 5G core after the user plane of the BNG and the user plane of the 5G core have been coupled.

A broadband network gateway (BNG) in a wireline network. The BNG including an interworking function in a control plane (IF-CP) means, the IF-CP means configured to: exchange registration messages with a fifth generation (5G) core in a 5G network to register a residential gateway in the wireline network, at least one of the registration messages containing a temporary identifier (ID) corresponding to the residential gateway; exchange authentication messages with the 5G core to authenticate the residential gateway; and exchange session messages with the 5G core to establish a session between the BNG and the 5G core, one of the session messages containing a tunnel endpoint ID for the BNG and another of the session messages containing a tunnel endpoint ID for a user plane function (UPF) component in the 5G core; and an interworking function in a user plane (IF-UP) means, the IF-UP means configured to set up a tunnel between the BNG and the 5G core after establishment of the session.

A method of facilitating communications between a wireline network and a fifth generation (5G) network. The method including transmitting, by an interworking function in a control plane (IF-CP) means of a broadband network gateway (BNG), a registration request to a 5G core in the 5G network, the registration request carrying a temporary identifier (ID) with location information corresponding to a residential gateway (RG) in the wireline network; exchanging, by the IF-CP means, authentication messages with the 5G core to authenticate the RG; exchanging, by the IF-CP means, registration messages with the 5G core to complete registration; transmitting, by the IF-CP means, a protocol data unit (PDU) session establishment request to the 5G core, the PDU session establishment request carrying an identifier (ID) of the RG; receiving, from the 5G core, a PDU session acknowledgement (ACK) and establishing a session, the PDU session ACK carrying the TEID of a user plane function (UPF) in the 5G core; providing, by the IF-CP means, the TEID of the UPF in the 5G core to a user plane (IF-UP) means of the BNG such that the IF-UP means of the BNG is able to establish a tunnel based on the session; encapsulating a data packet with a tunnel header including the TEID of the UPF in the 5G core; and transmitting a data packet over the tunnel to the 5G core.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network device in a wireline network, comprising:
   at least one memory containing instructions;
   one or more processors coupled to the at least one memory, the one or more processors configured to execute the instructions to cause the network device to:
   transmit a registration request to a core network in a wireless network to register a residential gateway in the wireline network, the registration request containing a temporary identifier corresponding to the residential gateway;
   exchange session messages with the core network to establish a session between the network device and the core network, one of the session messages containing a tunnel endpoint identifier for the network device and another of the session messages containing a tunnel endpoint identifier for a user plane function component in the core network; and
   send data packets toward the core network after a tunnel between the network device and the core network is established.

2. The network device of claim 1, wherein the registration request sent from the network device to access and mobility management function component in a control plane of the core network.

3. The network device of claim 1, wherein a user plane of the network device is configured to encapsulate a data packet with a tunnel header for transmission of the data packet over the tunnel.

4. The network device of claim 3, wherein the tunnel header includes the tunnel endpoint identifier for the user plane function component.

5. The network device of claim 1, wherein the registration request is transmitted to an authentication server function of the core network by way of an access management mobility function of the core network to enable the core network does not need to perform calculation for authentication.

6. The network device of claim 1, wherein the registration request includes an indication indicating that the residential gateway has already been authenticated by an access network or the network device.

7. The network device of claim 1, wherein the registration request includes a secret key, wherein the secret key is used to indicate that the residential gateway has already been authenticated by an access network or the network device.

8. The network device of claim 1, wherein the temporary identifier is associated with location information corresponding to the residential gateway in the wireline network.

9. A method of establishing communications between a wireline network and a wireless network, comprising:
   transmitting, by a network device, a registration request to a core network in the wireless network, the registration request carrying a temporary identifier corresponding to a residential gateway in the wireline network;
   transmitting, by the network device, a session establishment request to the core network;
   receiving, from the core network, a session acknowledgement and establishing a session, the session acknowledgement carrying a tunnel endpoint identifier of a user plane function in the core network;
   sending data packets toward the core network, after a tunnel between the network device and the core network is established.

10. The method of claim 9, further comprising:
    encapsulating a data packet with a tunnel header including the tunnel endpoint identifier of the user plane function in the core network; and
    transmitting a data packet over the tunnel to the core network.

11. The method of claim 9, wherein the registration request indicates that the residential gateway has already been authenticated by an access network or the network device.

12. The method of claim 9, wherein the tunnel comprises a general packet radio service tunneling protocol for user data tunnel.

13. The method of claim 9, wherein the tunnel between a user plane of the network device and the user plane function of the core network comprises a generic route encapsulation tunnel or an Ethernet-based virtual local area network Layer 2 tunnel.

14. The method of claim 9, wherein the registration request is transmitted from a user plane of the network device to an access and mobility management function component in a control plane of the core network.

15. The method of claim 9, wherein the registration request is transmitted to an authentication server function of the core network by way of an access management mobility function of the core network to enable the core network does not need to perform calculation for authentication.

16. The method of claim 9, wherein the registration request includes an indication indicating that the residential gateway has already been authenticated by an access network or the network device.

17. The method of claim 9, wherein the registration request includes a secret key, wherein the secret key is used to indicate that the residential gateway has already been authenticated by an access network or the network device.

18. The method of claim 9, wherein the temporary identifier is associated with location information corresponding to the residential gateway in the wireline network.

19. A system comprising:
    a network device in a wireline network; and
    an access and mobility management function component of a core network, wherein the access and mobility management component is configured to:
    receive a registration request from the network device to register a residential gateway coupled to the network device, wherein the registration request containing a temporary identifier corresponding to the residential gateway; and
    receive a session establishment message from the network device to establish a session for the residential gateway; and
    transmit a session acknowledgement to the network device, wherein the session acknowledgement carrying a tunnel endpoint identifier of a user plane function component of the core network,
    wherein the network device is configured to send data packets toward the core network after a tunnel between the network device and a user plane function component of the core network is established.

20. The system of claim 19, wherein the registration request includes a secret key, wherein the secret key is used to indicate that the residential gateway has already been authenticated by an access network or the network device.

* * * * *